United States Patent
Wharton

(10) Patent No.: US 10,469,790 B2
(45) Date of Patent: Nov. 5, 2019

(54) CONTROL SYSTEM AND METHOD FOR AN AERIALLY MOVED PAYLOAD SYSTEM

(75) Inventor: Stephen Wharton, Weatherford, TX (US)

(73) Assignee: CABLECAM, LLC, Fort Worth, TX (US)

(*) Notice: Subject to any disclaimer, the term of this patent is extended or adjusted under 35 U.S.C. 154(b) by 423 days.

(21) Appl. No.: 13/471,924

(22) Filed: May 15, 2012

(65) Prior Publication Data
US 2013/0050467 A1  Feb. 28, 2013

Related U.S. Application Data

(60) Provisional application No. 61/529,676, filed on Aug. 31, 2011, provisional application No. 61/529,697,
(Continued)

(51) Int. Cl.
*H04N 13/243* (2018.01)
*H04N 5/60* (2006.01)
(Continued)

(52) U.S. Cl.
CPC .............. *H04N 5/60* (2013.01); *F16M 11/043* (2013.01); *F16M 11/18* (2013.01);
(Continued)

(58) Field of Classification Search
CPC .. H04N 7/185; H04N 5/60; H04N 2201/3252; H04N 2201/3253; H04N 1/32154; H04N 1/32203; H04N 1/32299; H04N 1/32304; H04N 5/2224; H04N 5/2251; H04N 5/232; H04N 13/00; H04N 13/0239; H04N 1/32144; H04N 2201/3204; H04N 2201/327; H04N 2201/3284;
(Continued)

(56) References Cited

U.S. PATENT DOCUMENTS 4,565,099 A   1/1986 Arnold
4,710,819 A * 12/1987 Brown .......................... 348/144
(Continued)

FOREIGN PATENT DOCUMENTS

WO   2005013195 A2   2/2005

OTHER PUBLICATIONS

International Search Report and Written Opinion for International Application No. PCT/US2012/053299, International Filing Date Aug. 31, 2012, Applicant Cablecam, LLC.
(Continued)

*Primary Examiner* — Jared Walker
*Assistant Examiner* — Samuel D Fereja
(74) *Attorney, Agent, or Firm* — Schroeder Intellectual Property Law Group, LLC

(57) ABSTRACT

A system and method for controlling an aerially moved payload having at least one information capturing device and at least one line, reel, and motor combination for maneuvering the payload. The system includes a database having at least one control parameter or location parameter input therein. An image viewing device is provided for displaying information from the at least one information capturing device and software for overlaying at least one of the at least one control or location parameter.

22 Claims, 4 Drawing Sheets

Related U.S. Application Data filed on Aug. 31, 2011, provisional application No. 61/532,788, filed on Sep. 9, 2011, provisional application No. 61/532,741, filed on Sep. 9, 2011, provisional application No. 61/607,993, filed on Mar. 7, 2012.

(51) Int. Cl.

| | | |
|---|---|---|
| *H04N 7/18* | (2006.01) | |
| *F16M 11/18* | (2006.01) | |
| *F16M 11/04* | (2006.01) | |
| *F16M 11/42* | (2006.01) | |
| *G03B 15/00* | (2006.01) | |

(52) U.S. Cl.
CPC ............ *F16M 11/425* (2013.01); *H04N 7/181* (2013.01); *H04N 7/185* (2013.01); *H04N 13/243* (2018.05); *G03B 15/006* (2013.01)

(58) Field of Classification Search
CPC ........ H04N 7/183; H04N 7/20; G06T 1/0021; G06T 2201/0051; G06T 2201/0061; G06T 2207/30181; G06T 1/0007; G06T 2200/32; G06T 2207/20228; G06T 7/0028; G06T 2207/10016; G06T 2207/10032; G06T 2207/30252
See application file for complete search history.

(56) References Cited

U.S. PATENT DOCUMENTS

| | | | |
|---|---|---|---|
| 5,225,863 A | 7/1993 | Weir-Jones | |
| 6,023,302 A | 2/2000 | Macinnis et al. | |
| 6,152,246 A | 11/2000 | King et al. | |
| 7,492,306 B2 | 2/2009 | Humphrey et al. | |
| 2004/0124803 A1* | 7/2004 | Rodnunsky | .................. 318/649 |
| 2005/0018766 A1* | 1/2005 | Iwamura | .................. 375/240.01 |
| 2006/0033463 A1* | 2/2006 | Rodnunsky et al. | ......... 318/649 |
| 2006/0095171 A1* | 5/2006 | Whittaker et al. | .............. 701/25 |
| 2007/0035627 A1* | 2/2007 | Cleary et al. | .................. 348/159 |
| 2007/0064208 A1* | 3/2007 | Giegerich et al. | ............. 353/122 |
| 2007/0198142 A1* | 8/2007 | Werback | .............. G08G 5/0008 701/3 |
| 2008/0063400 A1* | 3/2008 | Hudson et al. | ................ 398/106 |
| 2008/0180523 A1 | 7/2008 | Stratton et al. | |
| 2009/0073388 A1* | 3/2009 | Dumm | ............................. 352/243 |
| 2009/0177337 A1* | 7/2009 | Yuet | ...................... G05D 1/0044 701/2 |
| 2009/0207250 A1* | 8/2009 | Bennett et al. | ................ 348/144 |
| 2010/0084513 A1* | 4/2010 | Gariepy | .................. B64C 39/024 244/190 |
| 2010/0091103 A1* | 4/2010 | Peltonen et al. | .................. 348/82 |
| 2010/0228419 A1* | 9/2010 | Lee | .................... B60W 30/0953 701/25 |
| 2011/0137487 A1* | 6/2011 | Nishimaki | ................. B60T 7/22 701/1 |
| 2011/0190972 A1* | 8/2011 | Timmons | ................ G01C 21/34 701/31.4 |
| 2011/0204196 A1 | 8/2011 | Wharton | |
| 2012/0154572 A1* | 6/2012 | Stratton | ............... G05D 1/0044 348/114 |
| 2012/0154593 A1* | 6/2012 | Anderson | .............. H04N 5/222 348/157 |

OTHER PUBLICATIONS

Extended European Search Report for related European application No. 12828925.3 dated Mar. 5, 2015, 6 pages.
Search Report in related European Patent Application No. 12 828 925.3-1209 dated Feb. 26, 2018, 10 pages.

* cited by examiner

CONTROL SYSTEM AND METHOD FOR AN AERIALLY MOVED PAYLOAD SYSTEM

RELATED APPLICATIONS

This application claims priority to U.S. Provisional Application Ser. No. 61/529,676 entitled "3D Aerial Camera System" filed Aug. 31, 2011; U.S. Provisional Application Ser. No. 61/529,697 entitled "Control System for a 3D Aerial Camera" filed Aug. 31, 2011; U.S. Provisional Application Ser. No. 61/532,788 entitled "Digital Microphone and Digital Microphone Control System for an Aerially Moved Payload" filed Sep. 9, 2011; U.S. Provisional Application Ser. No. 61/532,741 entitled "Control System For An Aerially Moved Payload System" filed Sep. 9, 2011; and, U.S. Provisional Application Ser. No. 61/607,993 entitled "Aerial Camera System Having Multiple Payloads" filed Mar. 7, 2012—the contents of all of which are fully incorporated herein by reference.

FIELD OF THE INVENTION

The present invention is directed to a control system for controlling, monitoring, and maneuvering aerially moved payload system, and in particular an aerially moved payload system reporting or providing usable information from the payload.

BACKGROUND OF THE INVENTION

Aerial movement systems are useful for moving a payload, like for example a camera, over large expanses such as arena and stadium floors, open fields, or even military testing sites. Examples of such systems which may be used to aerially move a payload may be found, for example, in U.S. Pat. Nos. 6,809,495; 6,873,355; 6,975,089; 7,088,071; 7,127,998; and, 7,239,106.

As described in various embodiments of the aforementioned patents, aerial movement systems having a payload, like for example a platform and/or a camera, typically include one or more lines (e.g., a cables, ropes, strings, cords, wires, or any other flexible materials) attached to the payload. The one or more lines typically extend to the payload from four or five support beams surrounding the surface over which the payload traverses, and are controlled by one or more motor reels which extend and retract the one or more lines attached to the payload. The motor reels may be controlled using timers, software algorithms, remote controls, or any means known in the art. As the line(s) are extended and retracted, the payload may be moved in three-dimensions, i.e. in the x-direction, the y-direction, and the z-direction.

In aerially moved payload systems including, for example, a camera used to record or live-broadcast events, currently there are two individuals responsible for obtaining the video footage—a pilot who is responsible for maneuvering the payload and a "cameraman" responsible for adjusting, tilting, angling, and rotating the camera to obtain the video footage. In addition to in place of the "cameraman," individuals may also be needed to control and analyze any sound and/or data captured by the payload.

Presently, a pilot responsible for maneuvering the payload must constantly monitor two different screens in order to maneuver the payload, insure that the system is functioning properly, and insure that the cameraman or other individual has the best possible positions and angles for capturing the footage sought to be recorded and/or broadcasted by a camera, or is obtaining the full scope of sound and data the individual wants to capture.

The first screen a pilot must monitor is a screen containing a grid system showing the location of the payload over the area being filmed or broadcasted. This grid screen may additionally include information related to the status of a z- or vertical floor set by the pilot to insure the payload is not brought below a certain height, torque values for the reels to insure the lines controlling the payload aren't overly stressed, the x-, y-, z-direction joystick feedback sensitivity for the pilot joystick, the speed the payload is travelling at, the bounded flyspace and grid for insuring the payload is being moved within the flyspace and properly positioned, and the actual flight path of the payload shown as a trail of black or white dots. This screen may additionally include highlighted areas of obstacles or stationary objects in or around the flight path to instruct the pilot where the payload may not be safe or where the payload could potentially crash.

The second screen a pilot must look at displays information captured by the payload. For example, the second screen may display a video feed showing images captured by a camera in the payload. The video feed allows the pilot to view what the cameraman is working with to capture the footage in the area over which the payload is traversing. Seeing the video feed enables the pilot to position the payload in the best possible spot for the cameraman to capture a desired angle or shot for the recording or broadcast.

Because a pilot is presently required to monitor two separate screens, it requires the pilot's attention to be split and prevents the pilot from creating the best possible shot for the cameraman, while constantly monitoring the operating parameters of the aerially moved payload system, insuring the safety of the payload and any structures or individuals located in the area proximate the payload.

Therefore, it would be advantageous to create a control system where a pilot could monitor the operating parameters of the payload system while at the same time monitoring any information captured by and transmitted from the platform to insure complete safety and that the best and most complete information is captured. It would be further advantageous if such a system was capable of providing additional alarms to indicate if an operating parameter is at or near a threshold limit, or if a particular operating parameter has not been set.

The present invention is provided to solve these and other issues.

SUMMARY OF THE INVENTION

Accordingly, the present invention is directed to an improved control system for aerially moved payloads. The control system is configured to report operating parameters set in an associated database and measured by the system, position sensing of the payload, and any information captured by an imaging device, microphone, or other data gathering instrument included in the payload on a single video monitor or screen for monitoring of the payload by a pilot controlling the payload.

In some embodiments of the invention, visual and/or audible alarms may also be set and configured in the system to alert the pilot and any associated payload crew if particular thresholds, both high and low, are reached by any of the system components.

Alarms may additionally be set to notify the pilot and payload crew if any portion of the payload is malfunctioning or if a particular alarm has not been turned on prior to the system being activated or re-activated after a period of inactivity. The system may also be configured to provide a reminder or warning if any alarms are deactivated during usage for any reason.

An alarm may also be set to notify the pilot and payload crew if the payload is approaching any obstacles located proximate the surface over which the payload traverses. The alarms may be set to notify that the payload is approaching an object or that a portion of the payload, like for example a camera or imaging device, is rotating in a manner which may result in a portion of the captured information being blocked by an object.

Other advantages and aspects of the present invention will become apparent upon reading the following description of the drawings and detailed description of the invention.

DETAILED DESCRIPTION OF THE PRESENT INVENTION

While this invention is susceptible to embodiments in many different forms, there is described in detail herein, preferred embodiments of the invention with the understanding that the present disclosures are to be considered as exemplifications of the principles of the invention and are not intended to limit the broad aspects of the invention to the embodiments illustrated.

Figure 1:
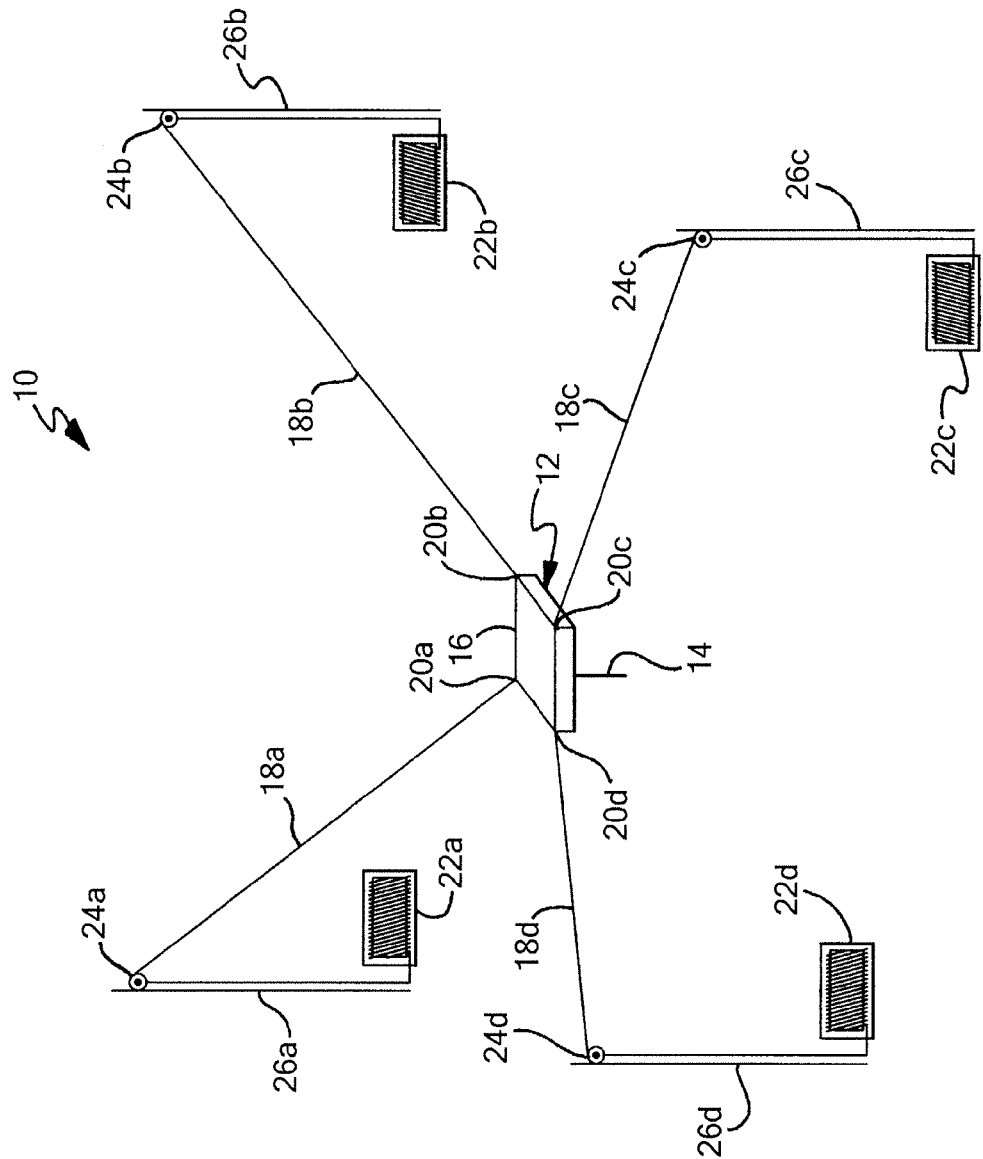
FIG. 1 shows an aerially moved payload system as contemplated by the invention.

An exemplary system 10 for aerially moving a payload 12 is shown in FIG. 1. Payload 12 includes at least one information capturing device 14 carried by platform 16. In order to move payload 12 and platform 16 in at least one of the x-, y-, and z-directions, at least one line, shown as lines 18a-18d, are connected to the platform in four locations, shown as corners 20a-20d. Coupled to and driving lines 18a-18d is at least one reel and motor combination, shown as motor and reel combinations 22a-22d. Motor and reel combinations 22a-22d act in conjunction with lines 18a-18d to move platform 16 and payload 12 in at least one of the x-, y-, and z-directions. Sheaves 24a-24d may be used in conjunction with motor and reel combinations 22a-22d in order to redirect lines 18a-18d to the platform. Sheaves 24a-24d may be attached to pillars or posts 26a-26d in an elevated position to better enable payload 12 to traverse over a desired area.

As should be appreciated by those having ordinary skill in the art, lines 18a-18d may contain, or have attached thereto, coaxial, optical, or other cables capable of transmitting and receiving information to and between a remote location and payload 12. For example, embedded or attached lines may be used to transmit any data or signals collected or obtained by payload 12 and control signals for moving platform 16 in at least one of the x-, y-, and z-directions. The embedded or attached lines may also be used to provide control signals from a remote production or control center to the payload in order to control and maneuver any instruments located on the payload.

The at least one information capturing device 14 may include any known camera or imaging device known in the art, any microphones or other sound capturing mechanisms known in the art, or any instruments used to measure any location characteristics or parameters. Examples of instruments which may be included in the payload include but are not limited to, spectrum analyzers or other devices capable of measuring frequency or signal strength at the payload location, thermometers or other temperature sensing devices, pressure sensing devices, light intensity or wavelength sensing devices, and wind speed and direction sensors.

Camera or imaging devices which may be included in the payload may include but are not limited to a standard or high definition camera having a zoom or prime lens, it may be a digital camera capable of taking both still shots and video or a high-speed, slow motion, or motion detecting camera, or it may be a camera having a lens or filter designed to remove or enhance a particular color, color spectrum, or an infrared or ultra-violate camera. Alternatively, the imaging device may be a night vision camera, a thermal imaging device, or an elevation or topography imaging or mapping device. The present invention contemplates that any camera or image capturing device be capable of broadcasting, recording, providing, and/or filming optical images. In some embodiments payload 12 may include more than one camera or imaging device capable of providing images. For example, payload 12 may include a high-definition camera and 3 prime lens cameras or a thermal imaging device and an elevation or topography mapping device. When utilizing multiple cameras and/or imaging device, any combination may be utilized by the system to obtain any images the operator desires.

Figure 2:
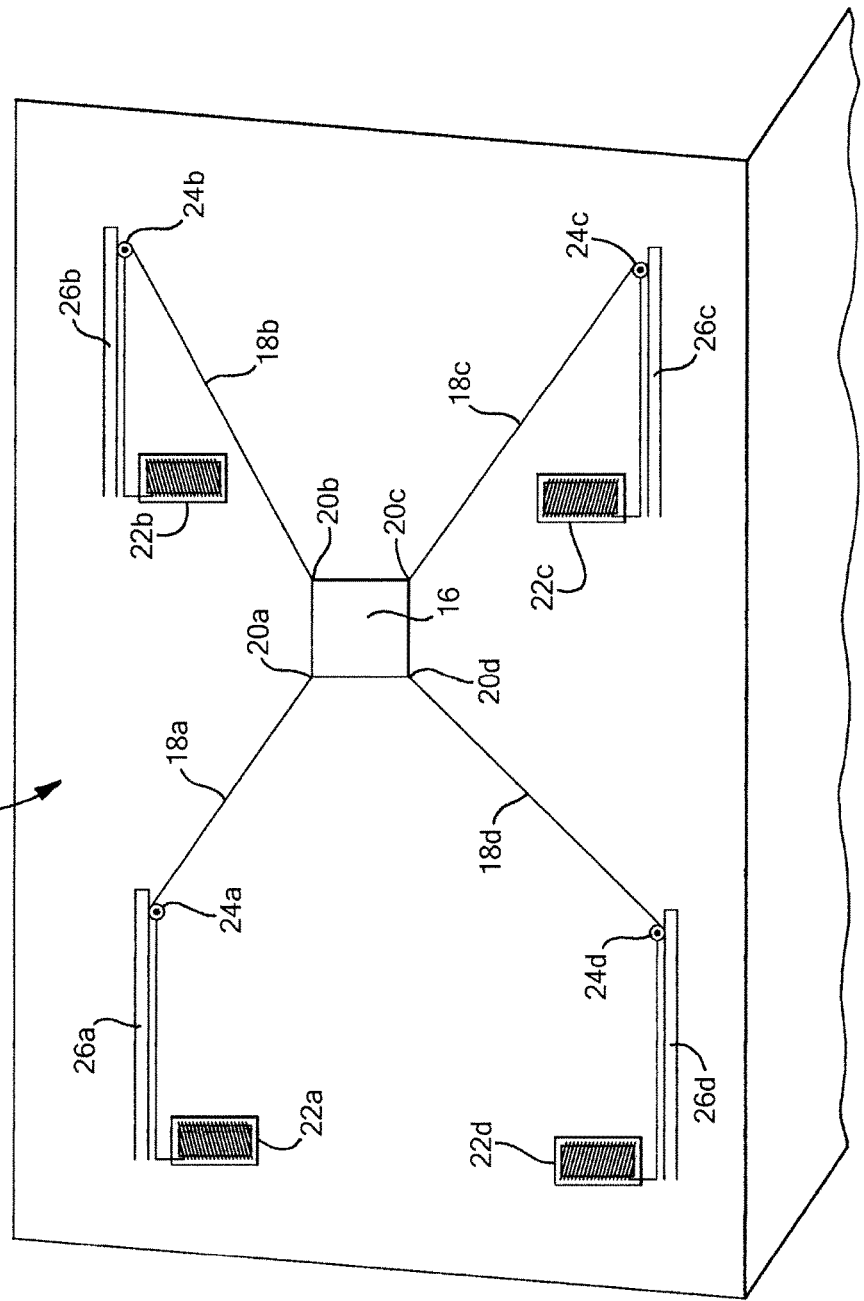
FIG. 2 shows an aerially moved payload system as contemplated by the invention.

An alternative embodiment of the aerial system shown in FIG. 1 is shown in FIG. 2. As seen in FIG. 2, rather than traverse over an area, it is contemplated by the invention that aerial movement system 12 may allow for payload 16 to traverse along side an area. As seen in FIG. 2, posts or pillars 26a-26d may extend substantially parallel to and/or above a ground surface or floor, allowing the payload to travel along side an area to be recorded. In such embodiments movement may be limited to only two directions, like for example the x- and z-directions. Configuring the system in this manner allows the payload to travel along side an area to obtain information when such is desirable or required.

In either aerial system, it is contemplated that not sheaves may be used, but rather reel and motor combinations 22a-22d maybe be directly affixed to any posts or other supporting structures. It should also be appreciated by those having ordinary skill in the art that though four motor and reel combinations are shown in FIGS. 1 and 2, it is contemplated by the invention that more or less motor and reel combinations may be used depending on the required movement of the system and nature of the environment. In some aerial systems as few as one motor or reel combination may be utilized while others may desire or require the use of more than four.

Figure 3:
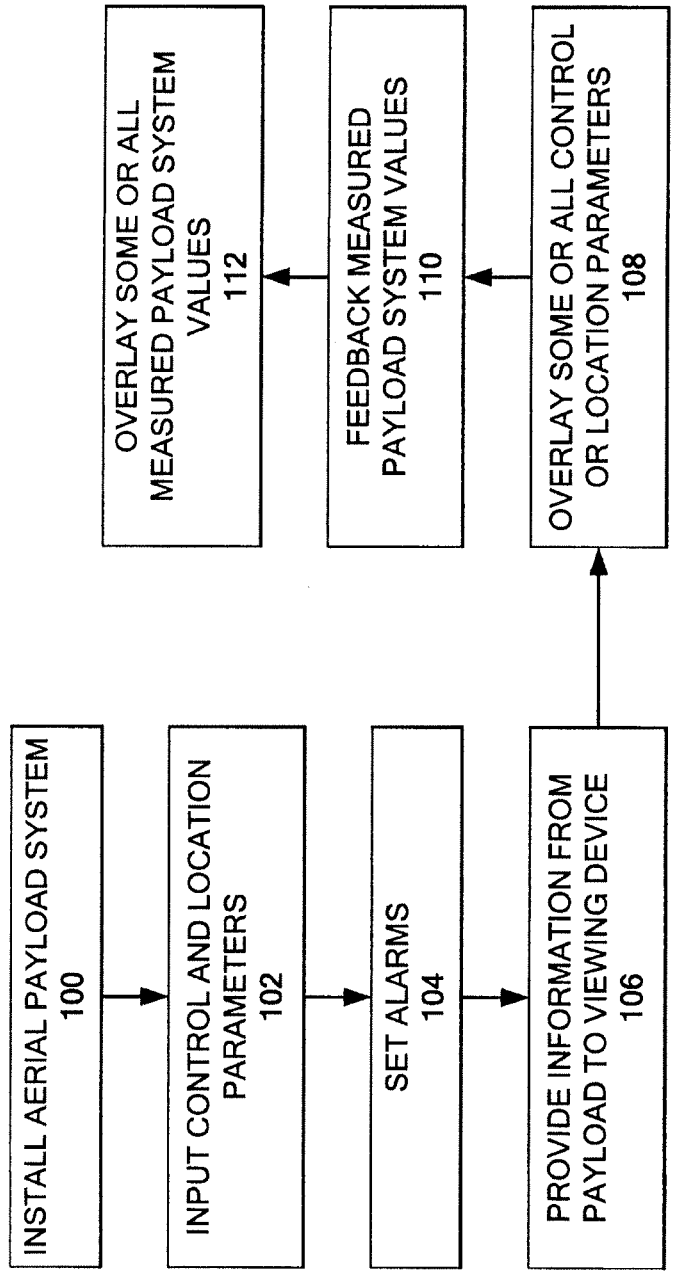
FIG. 3 shows a flow chart for controlling an aerially moved payload as contemplated by the present invention; and, FIG. 4 shows a visual display as viewed by a payload operator while maneuvering an aerially moved payload as contemplated by the present invention.

Once a system like those shown in FIGS. 1 and 2 or one similar one installed proximate the area to be recorded (step 100 in FIG. 3), the pilot or another individual associated with the system can input control parameters into a control system database for the payload and system to guide the navigation of the payload while insuring safe and secure operation (step 102).

The control parameters for the payload system and the payload transport system (i.e. the lines used to maneuver the payload) may include, for example, the environment parameters and any obstacles for the area over which the payload traverses, information related to floor or minimum elevation above the area the payload should travel, the maximum torque settings of each reel, the layout, boundaries, and gridding of the area over which the payload is to traverse, the maximum speed the payload should travel, and set sensitivity for the joystick or controller used by the operator to move the payload about the area.

In addition to setting control parameters, the pilot or another associated individual may set alarms to notify the pilot and crew if particular thresholds are being approached, a malfunction or non-operation of a system parameter, or any location obstacles or objects are being approached (step 104). For example, alarms may be set to notify the pilot and crew that the payload has travelled below a floor or that a floor has not been set, that a particular reel/line combination has exceeded or dropped below a particular torque value, if a motor/reel combination is no longer functioning, or if the speed of the payload is at or above a particular threshold.

Once the control parameters and alarms have been set, operation of the system may safely commence. Upon start up, a monitor will be provided to the pilot which will display information captured by the at least one information capturing device in the payload (step 106). The display will provide the pilot with any information captured by the payload, like for example images captured by a camera or data captured by a sensor, in order to insure that the payload is properly maneuvered to capture desired information.

A portion of all of the database information and associated software codes used to display the stored operating/control parameters previously will then be overlaid on top of the displayed information (step 108) on a single monitor. Rather than having two separate screens showing the operating parameters and captured information, requiring the operator to split his or her attention, overlaying allows the operator to monitor the information obtained by the payload, while at the same time continuously monitoring the position of the payload, the location of any obstacles or stationary objects, and the values of any monitored operating parameters.

The displayed values and indicia may be parameters set in the database, like for example the value of the floor, any objects, and the grid system for the area over which the payload will traverse, or instead may be values fed back to the system from (step 110), for example, from feedback lines associated with one or all of the platform or line/reel/motor combinations. For example, while a maximum speed and torque may have been set in the operating database, rather than display the maximums, the actual measured value provided by a feed back line associated with each may be displayed on the visual overlay to provide information to the operator (step 112). Feedback lines may likewise be used to provide the location of the payload relative to the area grid and/or any motor/reel combinations used to control the device. The feedback lines may be incorporated or embedded in, or attached to, lines 18a-18d in FIG. 1. The feedback lines may be any used or unused lines used to recover any information from the payload additionally or alternatively.

In order to provide feedback, it is contemplated by the invention that any sensors required to monitor, for example, the speed, location, or torque may be provided to any of the payload and reel/motor combinations. The sensors may obtain a value which is then provided to remotely located database and pilot directly via the feedback line, or alternatively may be provided to a modem which converts the data to an audio signal which is then embedded in a video signal and provided to a control center containing the database and operator. In order to recover the data from the audio signal, it should be appreciated by those having ordinary skill in the art that a demodulator or similar device may be used to convert the audio signals back to a data signal.

As a further alternative, it is contemplated by the invention that rather than use feedback lines any feedback data may be provided via RF signals wireless transmitted from the payload and/or any reel/motor combinations to the control center for use in the database and display for the operator. The RF signals may be generated and received using any means known in the art.

RF wireless signals may likewise be used to transmit any captured information from the payload to a remote production or control center utilizing the information. In such embodiments, rather than use embedded or attached coax or fiber optic lines, for example, both the payload and control center may include an antenna capable of transmitting and receiving RF signals. In order to transmit the information, it should be appreciated by those having ordinary skill in the art that any necessary media converters or the like may be included in both the payload and control center to allow for all information to be transmitted using wireless signals (or in the case of, for example wired optics signals).

The software overlaying the parameter information may also be configured to provide the audio or visual alarms if any value thresholds are being approached or have been reached, or if any value threshold controls have not been turned on or enabled. For example, when a floor or minimum elevation threshold is set in the database, the system will typically prevent the payload from traveling below that floor or elevation. The present system may be configured to provide, for example, a blinking light on the single monitor indicating that the floor has not been set, or the floor value itself may be highlighted in a different color and blink to indicate to the pilot that the floor was not set. If the pilot continues to maneuver the payload without setting the floor for a period of time, or if the pilot maneuvers the payload to a position below an internal system or previously set floor before the floor is turned on, a second auditory alarm may be provided by the system, notifying the pilot that the floor is not set and/or the payload is now located below the floor. Such video and audio alarms may be used for any maximum or minimum value set in the database, including torque values of any reels or the speed of the payload, or to alert that a particular object or obstacle is being approached.

Though the control parameters may be set before operation, it is contemplated by the invention that pilot or another associated individual may change or alter any parameters after the device begins operation. The altered values will adjust and appear on the overlaid visual display as they are adjusted. An alert or other indication may be provided to the operator to notify him or her that a particular value has changed.

Figure 4:
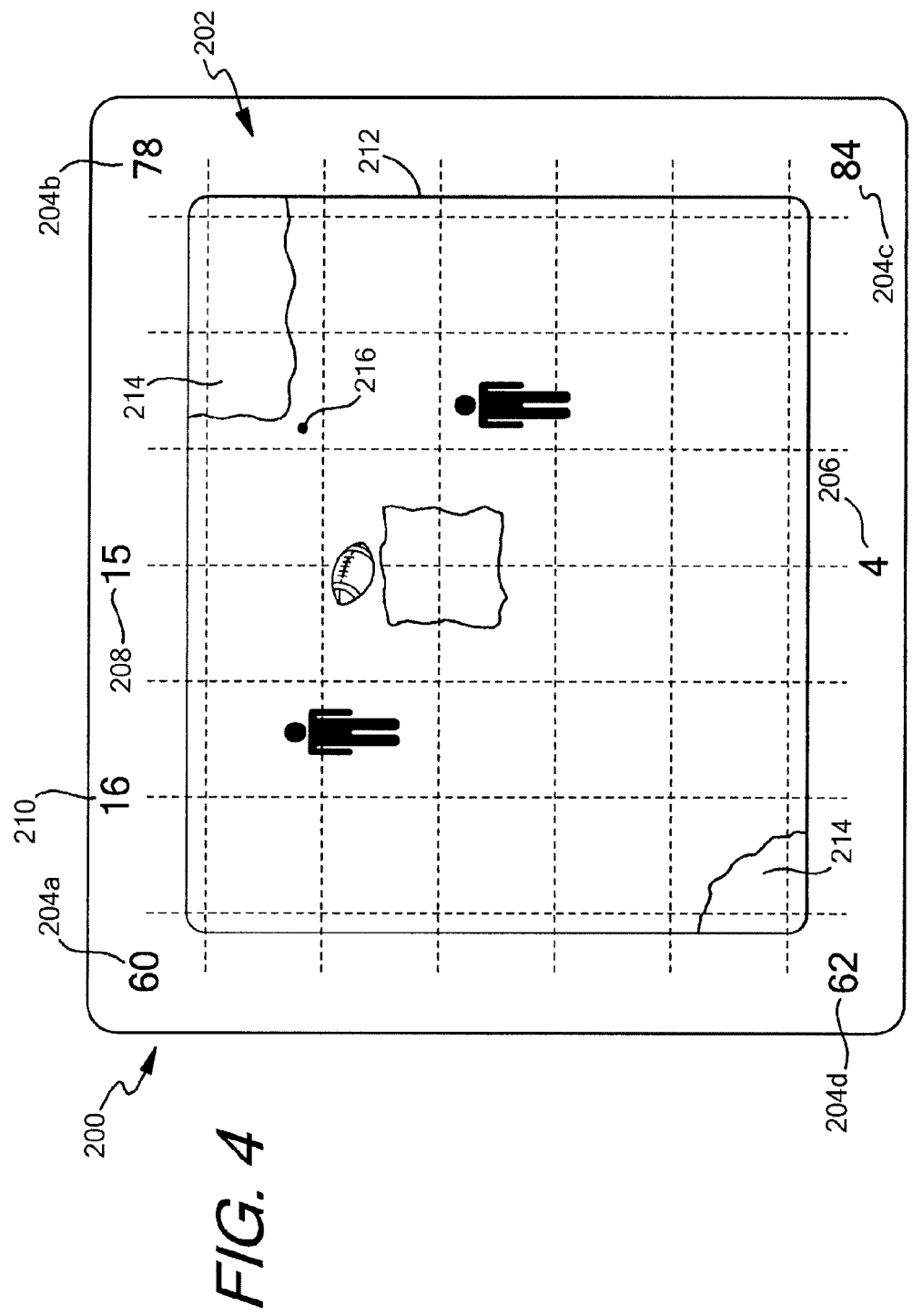

FIG. 4 shows a visual display or image viewing device 200 as contemplated by the invention. As shown in FIG. 4, the background view shows information in the form of images being captured by at least one of the image device located on the payload while operating parameters are overlaid thereon. As seen in FIG. 4, grid system 202, reel torque values 204a-d, joystick sensitivity value 206, floor value 208, payload speed 210, boundaries 212, obstacles 214, and the location of the payload 216 may all be overlaid the image. It should be appreciated by those having ordinary skill in the art that any overlaid values or images may be any color which will be visible over the images provided by the imaging device. It should also be appreciated that any grid and location indicia provided on the screen may not correspond to the current image being provided. Inasmuch as the grid and location indicia, including the location of the payload and objects located proximate the area, are provided for the entire area and the image is only for a particular shot, the image may only contain a small portion of the total area.

While FIG. 4 shows information in the form of images captured by a camera, it should be appreciated by those having ordinary skill in the art that other information captured by other information capturing devices may be displayed. For example, a graph or similar data plotting device may be used to show the current measured signal strength from a spectrum analyzer or other frequency or signal strength measuring device.

While in the foregoing there has been set forth a preferred embodiment of the invention, it is to be understood that the present invention may be embodied in other specific forms without departing from the spirit or central characteristics thereof. The present embodiments, therefore, are to be considered in all respects as illustrative and not restrictive, and the invention is not to be limited to the details given herein. While specific embodiments have been illustrated and described, numerous modifications come to mind without significantly departing from the characteristics of the invention and the scope of protection is only limited by the scope of the accompanying claims.

I claim:

1. A method for controlling an aerially moved payload comprising the steps of:
    installing an aerially moved payload system proximate an area over which a payload will travel, the payload including at least one information capturing device and at least one line, reel, and motor combination for maneuvering the payload;
    inputting at least one minimum and/or maximum value for at least one control parameter for the aerially moved payload system;
    inputting a grid covering at least a portion of the area the payload will travel into a database;
    providing captured information to a viewing device from the at least one information capturing device for an operator to remotely view the captured information;
    measuring the at least one control parameter for the aerially moved payload system;
    receiving at least one feedback value from the aerially moved payload system, the at least one feedback value being the at least one control parameter measured for the aerially moved payload;
    receiving a location of the payload from at least one feedback; and,
    overlaying the at least one minimum and/or maximum value for the at least one control parameter over the captured information displayed on the viewing device;
    overlaying the grid and the location of the payload relative to the grid over the captured information displayed on the viewing device; and
    overlaying the at least one feedback value over the captured information displayed on the viewing device, so that the at least one minimum and/or maximum value for the at least one control parameter, the at least one location parameter, the at least one feedback value, the grid and the location of the payload relative to the grid, and the captured information are all displayed on a single screen.

2. The method of claim 1 further comprising the step of inputting at least one of the following control parameters: a minimum elevation over the area the payload should reach, a maximum speed the payload should travel, a maximum and/or minimum torque value for the at least one line, reel, and motor combination, and a joystick or controller sensitivity for remotely controlling movement of the payload.

3. The method of claim 2 wherein the at least one received feedback value comprises one or more of the current speed of the payload, the location of the payload over the area, and the current torque placed on the at least one line, reel, and motor combination.

4. The method of claim 3 further comprising the step of setting an alarm if any feedback values are substantially equal to any maximum or minimum parameter value input into the database.

5. The method of claim 4 further comprising the step of setting a visual alarm to appear on the viewing device if any feedback values are substantially equal to any maximum and/or minimum parameter value input into the database.

6. The method of claim 4 further comprising the step of setting an audio alarm if any feedback values are substantially equal to any maximum and/or minimum parameter value input into the database.

7. The method of claim 3 further comprising the step of overlaying at least one feedback value indicating the current speed of the payload, the location of the payload over the area, and the current torque placed on the at least one line, reel, and motor combination over the image provided from the at least one information device on the viewing device.

8. The method of claim 2 further comprising the step of providing at least one visual or audio alarm if a control parameter is not set in the system before operation.

9. The method of claim 1 further comprising the step of inputting at least one of the following location parameters: any obstacles located above or proximate the area over which the payload will travel, the boundaries of the area over which the payload will travel and/or the layout of the area over which the payload will travel.

10. The method of claim 9 further comprising the step of providing feedback indicating the location of the payload over the area.

11. The method of claim 10 further comprising the step of setting a visual alarm to appear on the viewing device if the location of the payload approaches any obstacles input into the system or any area boundaries over which the payload is to travel.

12. The method of claim 11 further comprising the step of setting an audio alarm if the location of the payload approaches any obstacles input into the system or any area boundaries over which the payload is to travel.

13. The method of claim 1 further comprising the step of providing information on the viewing device in the form of an image feed.

14. The method of claim 1 further comprising the step of sensing at least one location characteristic at the payload.

15. The method of claim 14 further comprising the step of providing information on the viewing device related to the sensed location characteristic.

16. A system for controlling movement of an aerially moved payload having at least one image device, the system comprising:

a payload having at least one information capturing device and at least one line, reel, and motor combination for moving the payload;

a database having at least one minimum and/or maximum value for at least one control parameter, a grid covering at least a portion of an area over which the payload is configured to travel;

a viewing device;

at least one line providing captured information from the at least one information capturing device to the viewing device for display on the viewing device;

at least one line providing feedback, the feedback being values measured at one or more of the payload or the at least one line, reel, and motor combination;

at least one line providing feedback of the location of the payload over the area which the payload is configured to travel; and, software for overlaying
  the at least one minimum and/or maximum value for at least one control parameter,
  the at least one location parameter,
  the values measured and provided through feedback,
  the grid and the location of the payload relative to the grid,
on the viewing device over top of the captured information so that the at least one minimum and/or maximum value, the grid, the values measured and provided through feedback, the captured information, the grid, and the location of the payload relative to the grid are all displayed on the viewing device.

17. The system of claim 16 wherein the software is configured to provide an audio or visual alarm based on feedback provided by the at least one feedback line and any control or location parameters contained in the database.

18. The system of claim 17 wherein the database includes at least one control parameter from the group comprising: a minimum elevation over the area the payload should reach, a maximum speed the payload should travel, a maximum and/or minimum torque value for the at least one line, reel, and motor combination, and a joystick or controller sensitivity for remotely controlling movement of the payload.

19. The system of claim 17 wherein the database includes at least one location parameter from the group comprising: any obstacles located above or proximate the area over which the payload will travel, the boundaries of the area over which the payload will travel and/or the layout of the area over which the payload will travel.

20. The system of claim 16 wherein the software is configured to provide an audio or visual alarm if any control parameters are not located in the database.

21. The system of claim 16 wherein the at least one information capturing device includes at least one image capturing device.

22. The system of claim 16 wherein the at least one information capturing device includes at least one device for sensing or measuring a location characteristic.

* * * * *